United States Patent
LeJeune, Jr.

(10) Patent No.: US 11,877,171 B1
(45) Date of Patent: Jan. 16, 2024

(54) WIRELESS PROXIMITY DETECTION REPORTING

(71) Applicant: Satellite Tracking of People LLC, Houston, TX (US)

(72) Inventor: David W. LeJeune, Jr., Conroe, TX (US)

(73) Assignee: Satellite Tracking of People LLC, Houston, TX (US)

( * ) Notice: Subject to any disclaimer, the term of this patent is extended or adjusted under 35 U.S.C. 154(b) by 0 days.

(21) Appl. No.: 18/047,048

(22) Filed: Oct. 17, 2022

Related U.S. Application Data

(62) Division of application No. 17/003,499, filed on Aug. 26, 2020, now Pat. No. 11,490,278.

(51) Int. Cl.
  *H04L 43/10* (2022.01)
  *H04W 24/08* (2009.01)
  *H04W 4/80* (2018.01)
  *H04W 76/11* (2018.01)
  *H04W 24/04* (2009.01)

(52) U.S. Cl.
  CPC ............. *H04W 24/08* (2013.01); *H04L 43/10* (2013.01); *H04W 4/80* (2018.02); *H04W 24/04* (2013.01); *H04W 76/11* (2018.02)

(58) Field of Classification Search
  CPC ....... H04W 24/08; H04W 4/80; H04W 24/04; H04W 76/11; H04L 43/10
  See application file for complete search history.

(56) References Cited

U.S. PATENT DOCUMENTS

2018/0220301 A1* 8/2018 Gallagher ............. H04W 4/021
2019/0253837 A1* 8/2019 Hodge .................... H04M 3/38

\* cited by examiner

*Primary Examiner* — Said M Elnoubi
(74) *Attorney, Agent, or Firm* — Fogarty LLP

(57) ABSTRACT

A system and method for detecting the proximity of wireless devices within a controlled-environment facility is disclosed. The wireless devices transmit period heartbeat messages to a central monitoring system. The wireless devices monitor communication channels for activity by other devices. The wireless devices report the activity by other devices in the status messages. The central monitoring system may assign a location to the other device based upon a location of the wireless device that sent the status message.

20 Claims, 8 Drawing Sheets

WIRELESS PROXIMITY DETECTION REPORTING

CROSS-REFERENCE TO RELATED APPLICATIONS

The present application is a divisional of commonly assigned U.S. patent application Ser. No. 17/003,499 entitled "Wireless Proximity Detection Reporting," filed Aug. 26, 2020 and issued as U.S. Pat. No. 11,490,278 on Nov. 1, 2022, the disclosure of which is hereby incorporated by reference herein in its entirety.

BACKGROUND

Correctional facilities, such as prisons and jails, usually allow residents (i.e., inmates) to communicate with family, friends, attorneys, and others outside the facility to allow the residents to maintain personal connections and to facilitate their transition back into society upon release. Most controlled-environment facilities allow some form of telephone calls, in-person visitation, video visitation, etc. for such communication.

However, correctional facilities prohibit residents from engaging in unauthorized communications with individuals outside of the facility. In most correctional facilities, unauthorized cell phones, smartphones, cellular-enabled smartwatch or tablets, and other mobile communications devices that allow a resident to circumvent the approved facility communication systems are considered contraband. Use of contraband communications devices within a controlled-environment facility may pose a security risk and may allow for continued criminal activity by the residents. Possession of a contraband communications device is considered a violation of facility rules and such devices are confiscated by the facility staff when found.

Authorities operating the controlled-environment facility often try to identify and block unauthorized use of contraband communications equipment. Existing methods for detecting and/or controlling access to contraband communications equipment include, for example, jamming frequencies used for cell phone communications and use of mobile detection equipment (e.g., "wands"). These methods have drawbacks. For example, jamming communication frequencies is illegal in the United States and disrupts authorized communications, and mobile detection equipment may not detect when a contraband device is powered off.

SUMMARY

The present invention is directed to proximity detection of devices in a controlled-environment facility and associating such devices with fraudulent use of external data connectivity. Embodiments of the systems and methods disclosed herein provide a mechanism to track associations between users, such as residents of a controlled-environment facility. Wireless device locations can be tracked to identify where two residents have overlapping visits from a geo-time spatial perspective, which information can be used to determine where, when, and with whom residents are associating within a facility. Embodiments provide a capability for wireless devices to detect each other's relative proximity to be able to determine if a resident is using illegal external data connectivity, for example, to download e-mail, etc., as opposed to using approved connectivity that is offered by the facility.

In an example embodiment, a method of operating a wireless device comprises: attaching to an approved wireless access point within a controlled-environment facility, sending status messages at intervals to a central monitoring system, monitoring one or more communication channels for activity by other wireless devices, and reporting the activity of other wireless devices to the central monitoring server in a status message. The activity of other wireless devices may be reported to the central monitoring server in a next transmitted status message from the wireless device. The approved wireless access point may comprise an access point that is a component of a wireless local area network installed in the controlled-environment facility. The status messages may be sent at preset periodic intervals and/or at intervals selected based upon predetermined events. The status messages may be heartbeat messages that notify the central monitoring system when the wireless device is in use.

The status messages may comprise one or more of: a location of the wireless device, an identifier of the wireless access point, a list of content downloaded by the wireless device, and a list of software in use on the wireless device. The status messages may further comprise one or more of: an identifier of another wireless device, a list of communications by another wireless device, a list of content downloaded by another wireless device, a list of content uploaded by another wireless device, an identifier of an access point in communication with another wireless device.

The monitored communication channels may comprise one or more of: cellular data channels, WiFi channels, Bluetooth channels, and commercial telephone network channels, or channels on networks using Low Power Wide Area Network (LPWAN) or Low-Power Long Range (LoRa) technologies.

The activity by the other wireless devices may comprise communications between the other wireless devices and unauthorized access points inside the controlled-environment facility and/or communication between the other wireless devices and access points outside the controlled-environment facility.

In another embodiment, a method of operating a network monitoring system, comprises: receiving status messages at intervals from a first wireless device, wherein the status messages are received via a wireless local area network associated with a controlled-environment facility, extracting proximity data from one or more status messages, wherein the proximity data is associated with a second wireless device, and wherein the proximity data provides information associated with communications by the second wireless device, determining if status messages have been received from the second wireless device, and assigning a location to the second wireless device based upon a location of the first wireless device when status messages have not been received from the second wireless device.

The first wireless device is attached to an approved wireless access point that is a component of the wireless local area network at the controlled-environment facility. The status messages may be heartbeat messages sent at regular intervals by the first wireless device. The status messages may comprise one or more of: a location of the wireless device, an identifier of the wireless access point, a list of content downloaded by the wireless device, and a list of software in use on the wireless device. The proximity data may comprise one or more of: an identifier of the second wireless device, a list of communications by the second wireless device, a list of content downloaded by the second wireless device, a list of content uploaded by the second wireless device, an identifier of an access point in communication with the second wireless device.

The method may further comprise determining whether the access point in communication with the second wireless device is inside the controlled-environment facility.

The method may further comprise authorizing the first wireless device to access selected content and/or to use certain software in response to receipt of the status message.

The method may further comprise blocking the second wireless device from accessing selected content and/or using certain software in response to failure to receive status messages from the second wireless device.

The method may further comprise identifying a third wireless device that is in the same location as the first wireless device and associating the location of the third wireless device and the location of the second wireless device.

In a further embodiment, a system comprises: a plurality of wireless devices that are configured to operate in a wireless local area network for a controlled-environment facility, the plurality of wireless devices further configured to monitor communication channels for activity by other wireless devices and to report the activity in status messages; a central monitoring system configured to receive status messages from the plurality of wireless devices, wherein the central monitoring system is configured to determine a location of a wireless device within the controlled-environment facility based upon a status message from the wireless device; and wherein the central monitoring system is further configured to assign a location to a selected wireless device when a status message has not been received from the selected wireless device and when the selected wireless device is identified in a status message from another wireless device.

BRIEF DESCRIPTION OF THE DRAWINGS

Figure 1:
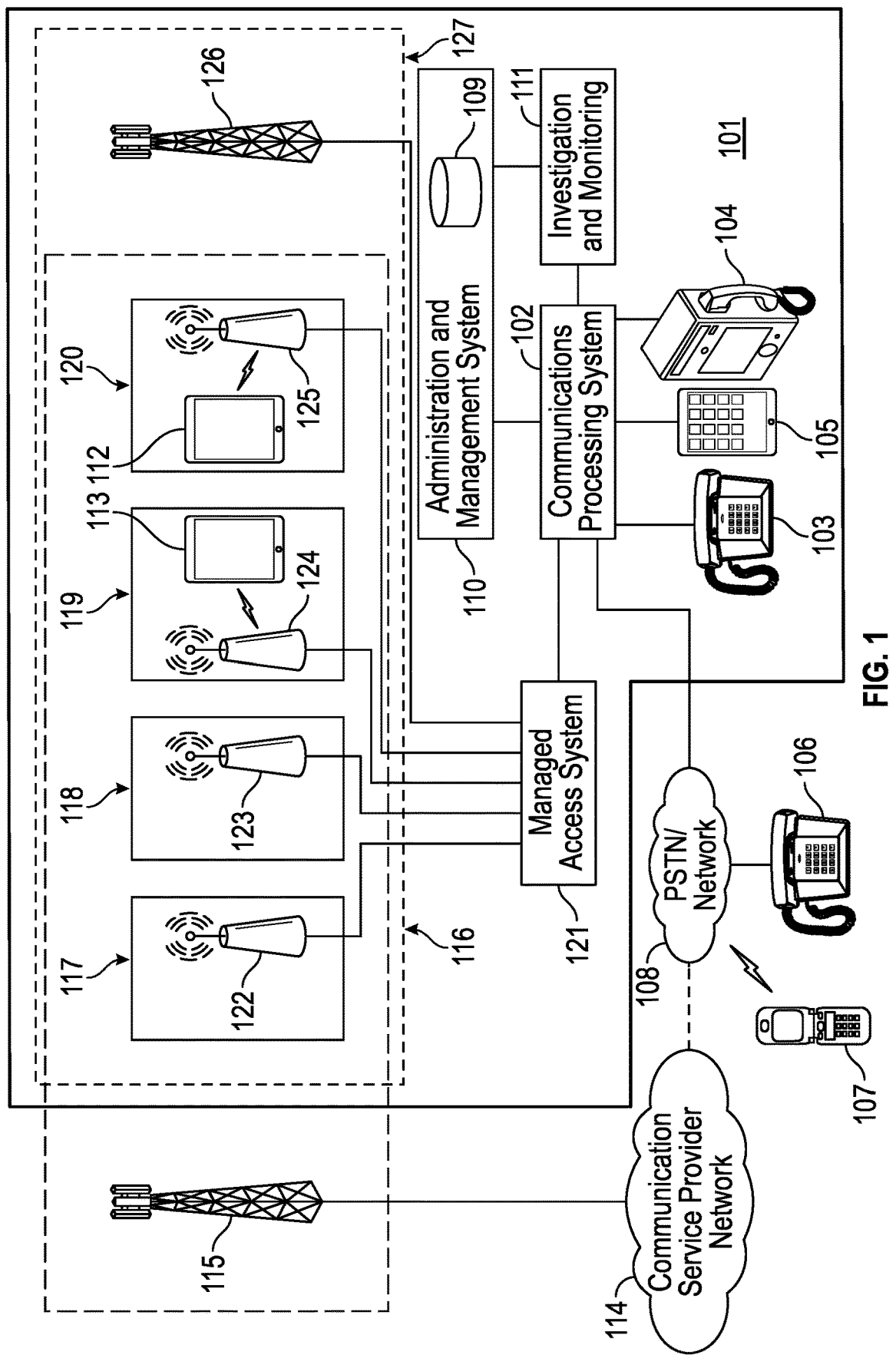

Having thus described the invention in general terms, reference will now be made to the accompanying drawings, which are not necessarily drawn to scale, and wherein:

FIG. 1 is a high-level block diagram of a controlled-environment facility having systems and methods for detecting contraband wireless communications devices and issuing alerts according to an example embodiment.

FIGS. 2-5 depict a portion of a controlled environment facility having a number of areas or zones.

Figure 6:
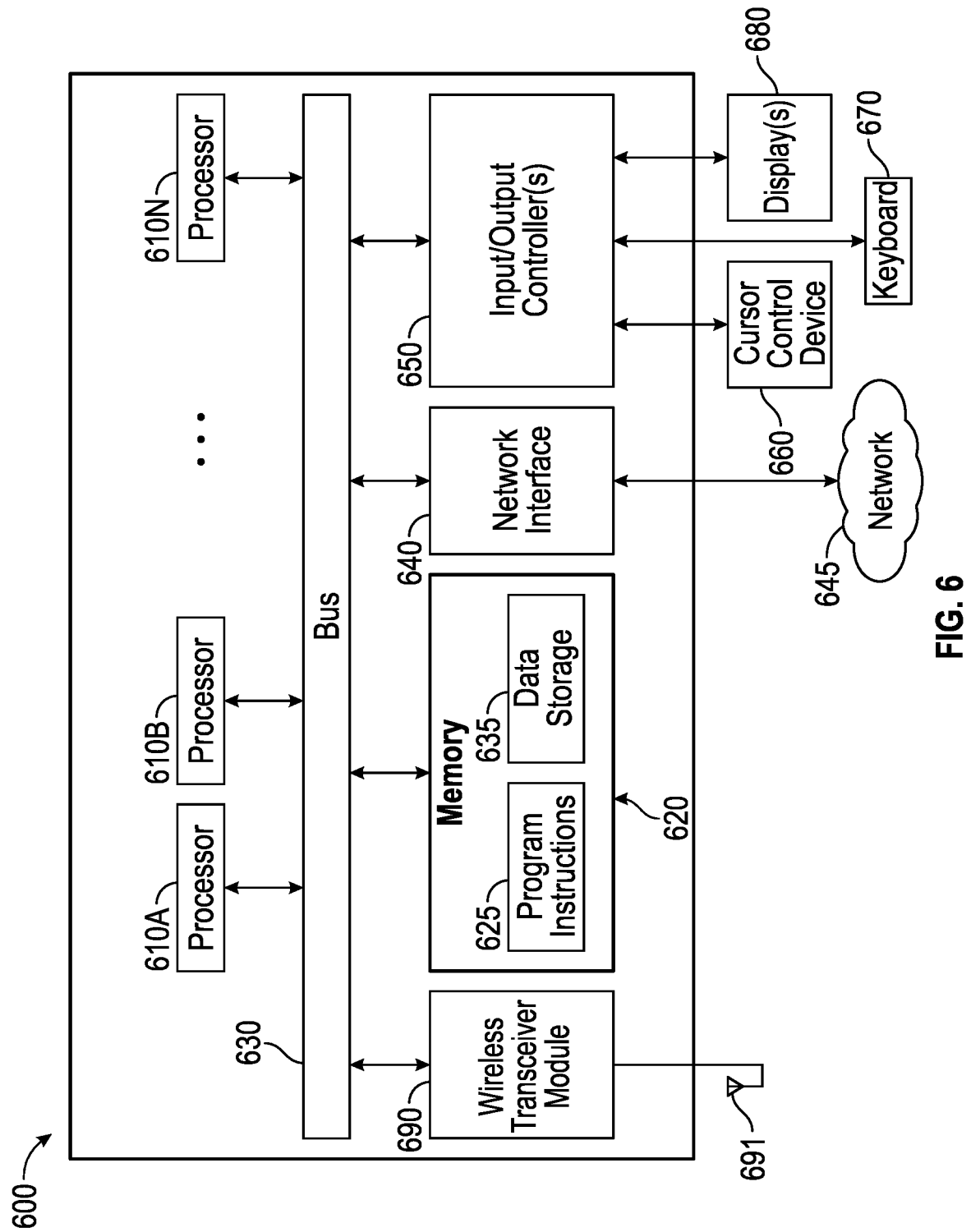

FIG. 6 is a block diagram of an example system for implementing embodiments disclosed herein.

Figure 7:
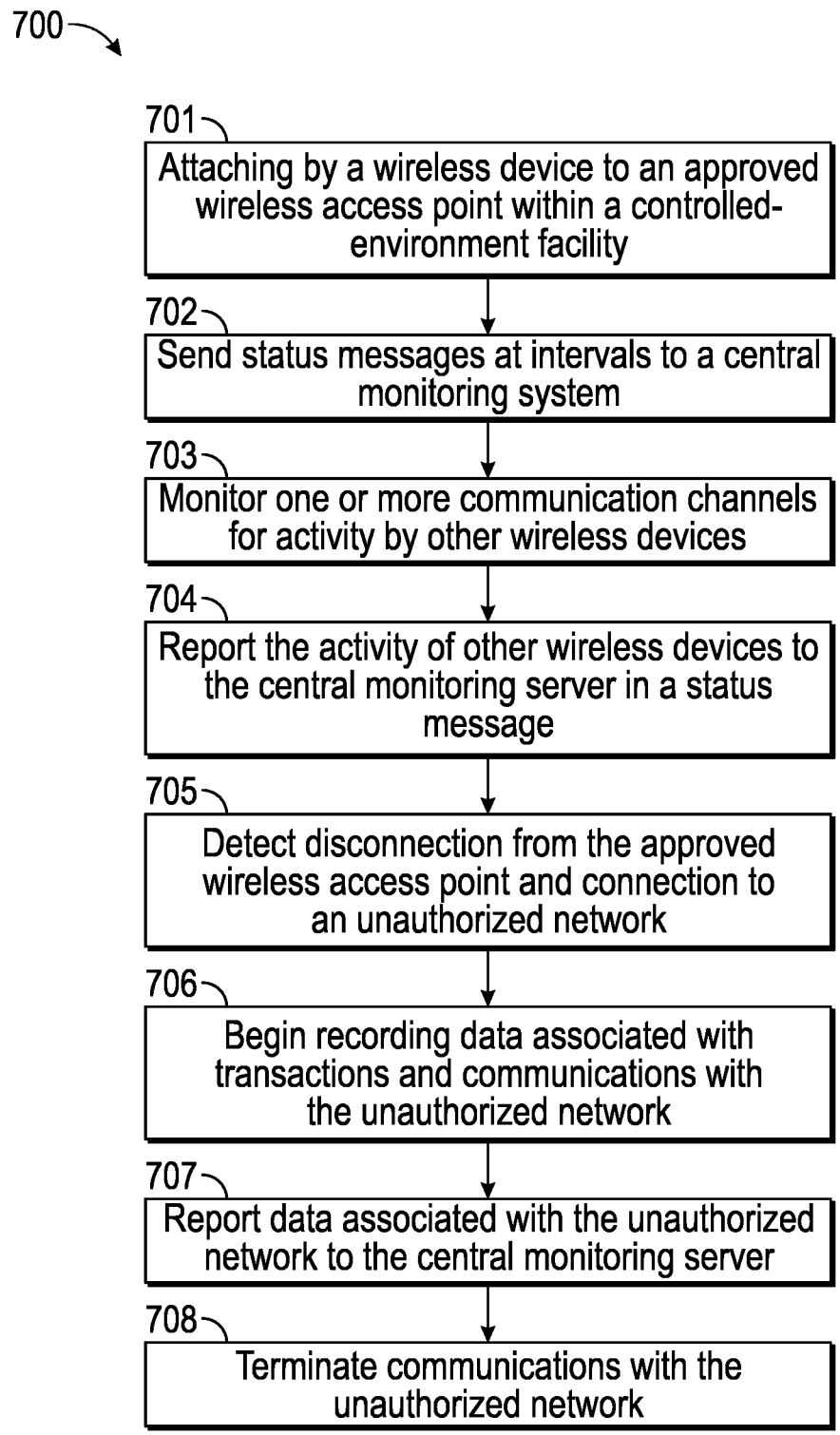

FIG. 7 is a flowchart illustrating a method for operating a wireless device that is configured to monitor activity of other wireless devices on a network according to an example embodiment.

Figure 8:
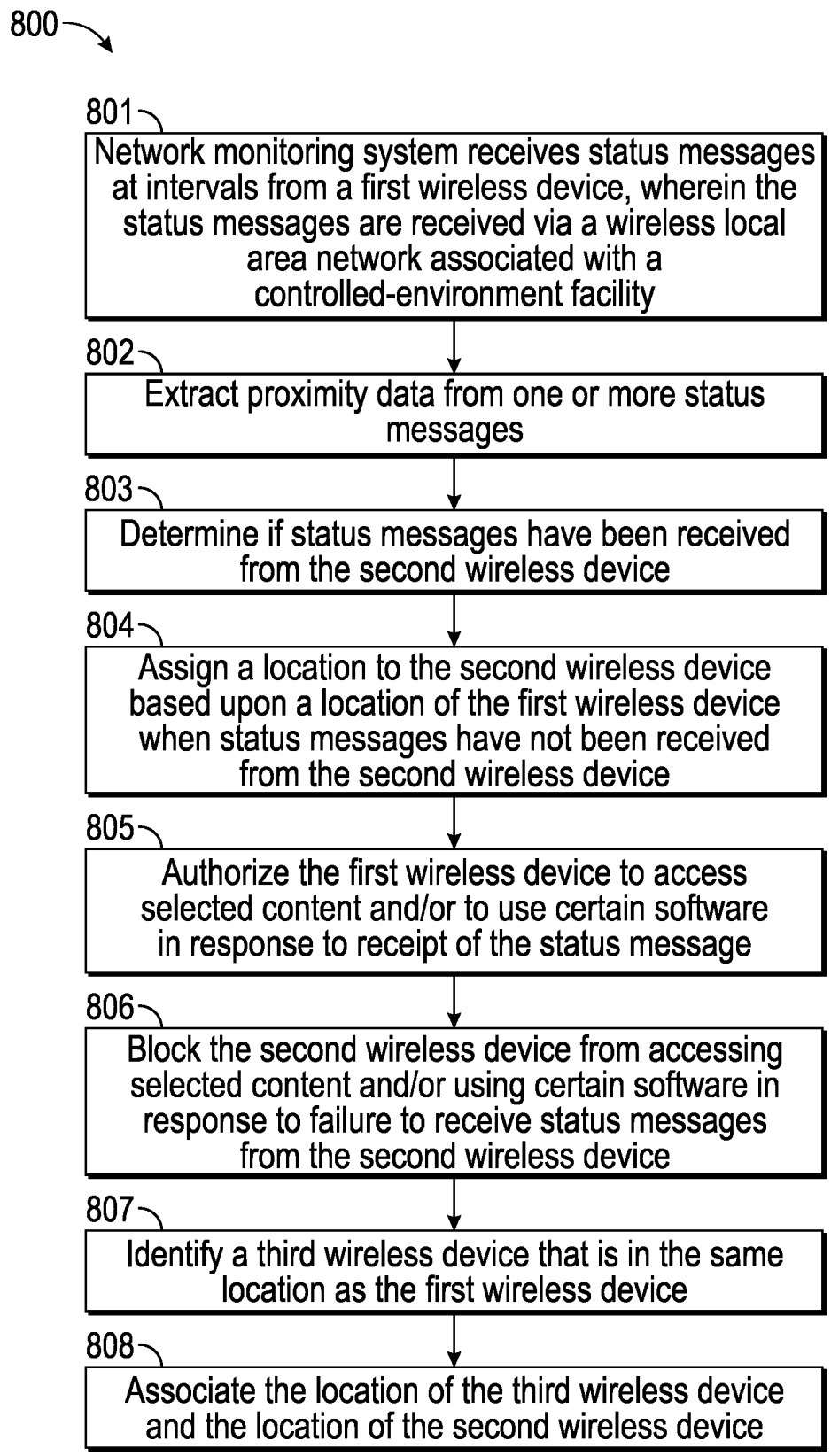

FIG. 8 is a flowchart illustrating a method for operating a network monitoring system according to an example embodiment.

While this specification provides several embodiments and illustrative drawings, a person of ordinary skill in the art will recognize that the present specification is not limited only to the embodiments or drawings described. The drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present disclosure relates generally to controlled-environment facilities and, more specifically, to detection of wireless communications devices within such facilities. In the law enforcement/correctional institution context, the staff of a controlled-environment facility needs to detect contraband cell phones and other communication devices to prevent unauthorized communications by residents, which often involve illegal activity. Controlled-environment facility residents obtain access to contraband devices through many different sources, such as visiting family and friends or even facility staff. Residents use the contraband communications devices to circumvent the facility's communication systems, which would otherwise limit who the resident could call and would usually allow for monitoring and/or recording of resident calls. During their communications, inmates may make incriminating admissions, commit further criminal acts, conspire to commit further criminal acts, or leave a trail of incriminating data. By circumventing the facility communication system, however, it may not be possible to monitor and detect such activities.

In the context of healthcare facilities, educational environments, or restricted living quarters, the medical staff or teachers may want to limit patient or student use of unauthorized or unmonitored communications to maintain a treatment plan or to control an academic environment. It will be understood that the systems and methods disclosed herein may be used with any long-standing, new, fixed, or temporary facility or location. Moreover, the unauthorized communications may be initiated by users that are present at the facility for any duration whether permanent, temporary, transient, long term, or short term. The users may be confined to the facility or may be free to come and go as they please. The users may be known or unknown to the facility staff. For example, the systems and methods disclosed herein may be used to detect unauthorized communications by attendees at a concert venue, fans at a sports stadium, participants in a conference or forum, or attendees at a parade, fair, festival, demonstration, rally, or celebration.

FIG. 1 is a high-level block diagram of a controlled-environment facility 101 having systems and methods for detecting wireless communications devices, which may include authorized and/or contraband devices. A communications processing system 102 provides communications for controlled-environment facility 101. This may include, for example, telephone services, videoconferencing, online chat, text/SMS messaging, and other forms of communications between residents and/or staff of controlled-environment facility 101 and individuals located outside the facility. In some embodiments, communications processing system 102 may be co-located with controlled-environment facility 101, as illustrated. Alternatively, communications processing system 102 may be centrally or remotely located with respect to one or more controlled-environment facilities and may provide communication services to multiple controlled-environment facilities. More generally, it should be noted that communications processing system 102 may assume a variety of forms and may be configured to serve a variety of facilities and/or users, whether within or outside of a controlled-environment facility.

Residents access communication services using telephones 103, video visitation or Intelligent Facility Devices (IFD) 104, and/or tablet devices 105 that are adapted and approved for use in controlled-environment facility 101. Device 104 may be, for example, a specialized video conferencing terminal, kiosk, or workstation, such as a processor-based self-service kiosk user terminal configured to communicate with an information management system to facilitate self-service acquisition of correctional facility information and services by a user thereof. For example, a resident initiating an approved telephone call may lift the receiver on telephone 103 or IFD 104 or may launch a communication application program on device 105. The resident may then be prompted to provide a personal identification number (PIN), other identifying information or biometrics.

Under the control of communication processing system 102, devices 103, 104 and 105 may connect to an outside telephone 106, wireless device 107, or other communication device via network 108. Telephone 106 and/or wireless device 107 may belong, for example, to a non-resident (e.g., any person not confined to the controlled-environment facility) or a staff member of the controlled-environment facility. The non-resident device may be accessed using any external network 108, such as a publicly switched telephone network (PSTN), an Integrated Services Digital Network (ISDN), Voice-over-IP (VoIP) network, or packet data network, such as, the Internet.

In addition to providing certain communication and visitation operations, communication processing system 102 typically ensures that the residents' calls, video conferences, online chats, text messages, etc. are connected only to non-residents whose identities, devices, email addresses, phone numbers, etc. are listed in that resident's pre-approved contact (PAC) or personal allowed numbers (PAN) list. The PAC/PAN may be a whitelist or a blacklist that identifies contacts that are allowed or restricted for the resident. Each resident's PAN list may be stored, for example, in a database 109 that is maintained by an administration and management system (AMS) 110, a jail management system (JMS), or the like. In addition to PAN lists, AMS 110 may also store inmate or resident profile data (RPD), such as balances for inmate trust and calling accounts, trial schedule, conviction data, criminal record, sentencing data, time served, time remaining to be served, release date, cell and cellmate assignments, resident restrictions and warnings, commissary order history, telephone call history, call recordings, known or suspected gang or criminal affiliations, known or suspected affiliates or accomplices, and any other information that may be relevant or useful to correctional facility staff. In scenarios where communication system 102 is located within the controlled-environment facility 101, it may have direct access to AMS 110. In other embodiments, however, communication system 102 may also be located remotely from the controlled-environment facility 101 and access to AMS 110 may be accomplished via a computer network such as network 108.

In some embodiments, communication system 102 is configured to monitor and/or record the residents' telephone and/or video visitations. An investigation and monitoring module 111 may record all or some resident communications. The content of other communications, such as texts, chat sessions, and emails, may also be captured and monitored. The communications may be monitored in real-time by an investigator or automatically monitored to detect the use of selected keywords, for example. The content and metadata associated with the residents' communications may be recorded and stored for later analysis, review, or investigation.

Most controlled-environment facilities restrict or prevent residents from communicating with persons outside of the facility using any unapproved device. Administrators of the controlled-environment facility may wish to limit the residents' contact to individuals on the resident's PAN list, for example. This protects people outside the controlled-environment facility from offensive, inappropriate, or illegal contact with a resident. Additionally, these restrictions prevent residents from directing further illegal activity with conspirators located outside of the controlled-environment facility. By limiting the communication by residents, the facility also ensures monitoring of residents' communications. Nonetheless, residents often find ways of bypassing the approved communication system. For example, contraband wireless devices 112, 113 are often smuggled into controlled-environment facilities.

Contraband wireless devices 112, 113 allow residents to bypass communication processing system 102 and instead establish communication with others using a third-party cellular service provider's network 114, such as any of the well-known and widely available global cellular providers. One or more antennas 115 provide communications service in an area or cell 116 overlapping some or all of controlled-environment facility 101. When the contraband wireless devices 112, 113 are turned on, they connect to communication service provider's network 114 via antenna 115, which allows for a resident's communications to be routed directly to network 114. This allows residents with contraband wireless devices 112, 113 to contact telephone 106 or wireless device 107 (e.g., tablets, personal computers, smartphones, etc. outside of facility 101) directly without any monitoring or control by communication processing system 102.

A controlled-environment facility 101 typically comprises several resident housing units 117-119, which may be referred to as pods, sections, units, dormitories, or blocks, for example. These housing units may be distributed across different buildings, wings, or floors of controlled-environment facility 101. Controlled-environment facility 101 also comprises various common spaces 120, such as dining halls, recreation areas, medical facilities, etc. In some controlled-environment facilities, a wireless containment solution (WCS) or managed access system (MAS) 121 may be used to intercept and manage communications initiated from contraband communications devices 112, 113. The managed access system 121 may employ one or more access points 122-125 as part of a distributed antenna system or other wireless distribution system. In one embodiment, access points 122-125 may be antennas that function as microcells or picocells that provide coverage for mobile communication service over limited areas. For example, a dedicated access point 122 may be placed within housing unit 117 so that all wireless communications devices within housing unit 117, including any contraband communications devices, will identify access point 122 as the primary provider of communication services. Other dedicated access points 123-125 may be placed within housing units 118, 119 and common area 120 so that all wireless communications devices within those areas will identify the respective access point as the primary provider for communications. Alternatively, a single antenna 126 or multiple antennas for managed access system 121 may service an area or cell 127 that overlaps some or all of controlled-environment facility 101.

In certain embodiments, the power levels associated with access points 122-125 may be adjusted such that the geographical area of the wireless communications coverage corresponds generally to the respective housing unit 117-119 or common area 120. Thus, all communications originating from within a particular housing unit 117-119 or common area 120 are directed through managed access system 121 through a specific wireless access point 122-125 that is associated with that unit or area. Each access point's power may be configured so that wireless devices within a particular unit will register with a specific access point and not with an access point in a neighboring unit or with a third-party service provider's antenna 115. This allows managed access system 121 to control whether radio resources and communication traffic channels are assigned when wireless devices within each unit or area of controlled-environment facility 101 attempt to initiate a communication connection.

By controlling any communication initiation, managed access system 121 can control and manage communications within controlled-environment facility 101. Communications initiated by, or directed to, contraband communications devices 112, 113 can be blocked without impacting legitimate wireless communications, such as calls from the facility staffs' wireless devices or from approved communications devices 105. Additionally, managed access system 121 can be configured to allow communications from only within designated areas and/or devices of the controlled-environment facility 101.

Managed access system 121 and associated access points 122-125 and/or antenna 126 may be a combination of a wireless network and a tightly controlled distributed antenna system. Managed access system 121 may employ any 2G, 3G, 4G and/or 5G technologies and other protocols that are used by wireless service providers. Almost all mobile phones use cellular technology, such as Global System for Mobile Communications (GSM) or code-division multiple access (CDMA) technology. However, it will be understood that the managed access system 121 disclosed herein can be used with any current, legacy, or future cellular technology or protocols, such as GSM, General Packet Radio Service (GPRS), cdmaOne, CDMA2000, Evolution-Data Optimized (EV-DO), Enhanced Data Rates for GSM Evolution (EDGE), Long Term Evolution (LTE), Universal Mobile Telecommunications System (UMTS), Digital Enhanced Cordless Telecommunications (DECT), and Digital AMPS (IS-136/TDMA). Additionally, or alternatively, access points 122-125 and/or antenna 126 may support other communication formats.

In some embodiments, managed access system 121 may capture identifying data from contraband communications devices 112, 113, such as an International Mobile Equipment Identifier (IMEI), Mobile Subscriber Integrated services Digital Network Number (MSIDN), Mobile Equipment IDentifier (MEID), Equipment Serial Numbers (ESN), International Mobile Subscriber Identity (IMSI), or Temporary Mobile Subscriber Identity (TMSI) assigned to the device, dialed telephone numbers, message addresses, and the like. This identifying data can be used, for example, to correlate information captured across several communication sessions or attempts. The identifying data may also be used to identify a specific device and possibly to identify where the device was purchased, and by whom, to identify the source of contraband communications devices 112, 113. Such identifying data may be captured by the managed access system 121 even if the device itself is not found during a search.

Managed access system 121 may apply policy rules as determined by controlled-environment facility administrators, which may be enforced by AMS 110 via communications processing system 102. The policy rules as applied to contraband communications devices 112, 113 may, for example, allow calls, messages, or data to be connected to called parties, require blocking calls or messaging attempts, allow for monitoring of call, message, or data content, and/or recording of calls, messaging, or data communication content. The policy rules may be applied in different ways across controlled-environment facility 101 so that communications initiated by contraband communications devices 112, 113 within different housing units or common areas are treated in a different way depending upon a device's location. For example, calls may be allowed, monitored, and recorded for devices in housing unit 117, but blocked in housing units 118, 119 and common area 120.

Managed access system 121 and associated access points 122-125 and/or antenna(s) 126 may provide various levels of functionality in different embodiments. For example, managed access system 121 may provide live communications service and allow contraband devices 112, 113 to communicate with outside PSTN/network 108. This would allow investigators to monitor and/or record communications between residents of the controlled-environment facility and outside parties and to identify which devices 106, 107 are contacted by the residents. In other embodiments, managed access system 121 may cause contraband communications devices 112, 113 to function as if connected to a live network but not actually complete attempted communications, such as by generating a busy signal. This may cause the resident to attempt further communications using contraband communications devices 112, 113 and thereby unknowingly provide additional information to investigators.

Managed access system 121 is not limited to detecting wireless telephone activity. In other embodiments, managed access system 121, access points 122-125, and antenna 126 may be configured to support any radio frequency (RF) interface for a wireless local area network (WLAN), such as connections based on Wi-Fi, Bluetooth, ZigBee, WiMAX, Near-field communication (NFC), or other communication protocols or standards. For example, a Wi-Fi enabled device 112 may attempt to access a wireless network but instead attaches to a Wi-Fi network being emulated by managed access system 121. Device 112 may be identified, for example, by an IMSI, IMEI, IP or MAC address. Any activity by device 112, such as messages sent or website connections attempted, may be logged by investigation and monitoring module 111 and may trigger notifications or alerts.

As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers, and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents.

The term "contraband communications devices" as used herein may refer to any unauthorized cellular telephone, mobile telephone, smartphone, cellular-enabled smartwatch, tablet computer, portable personal computer wireless or cellular modem, whether it be foreign or domestic, or other device that supports wireless communication.

FIGS. 2-5 depict a portion of a controlled environment facility 201 having a number of areas or zones 201a-f, such as one or more cells, pods, housing units, common areas, hallways, classrooms, etc. Each zone 201a-f is served by a dedicated wireless access point (WAP) 202a-f that is configured to provide data connectivity within the corresponding zone. The WAPs 202a-f may be part of a WLAN, commercial cellular network, or local managed access system, for example.

Figure 2:
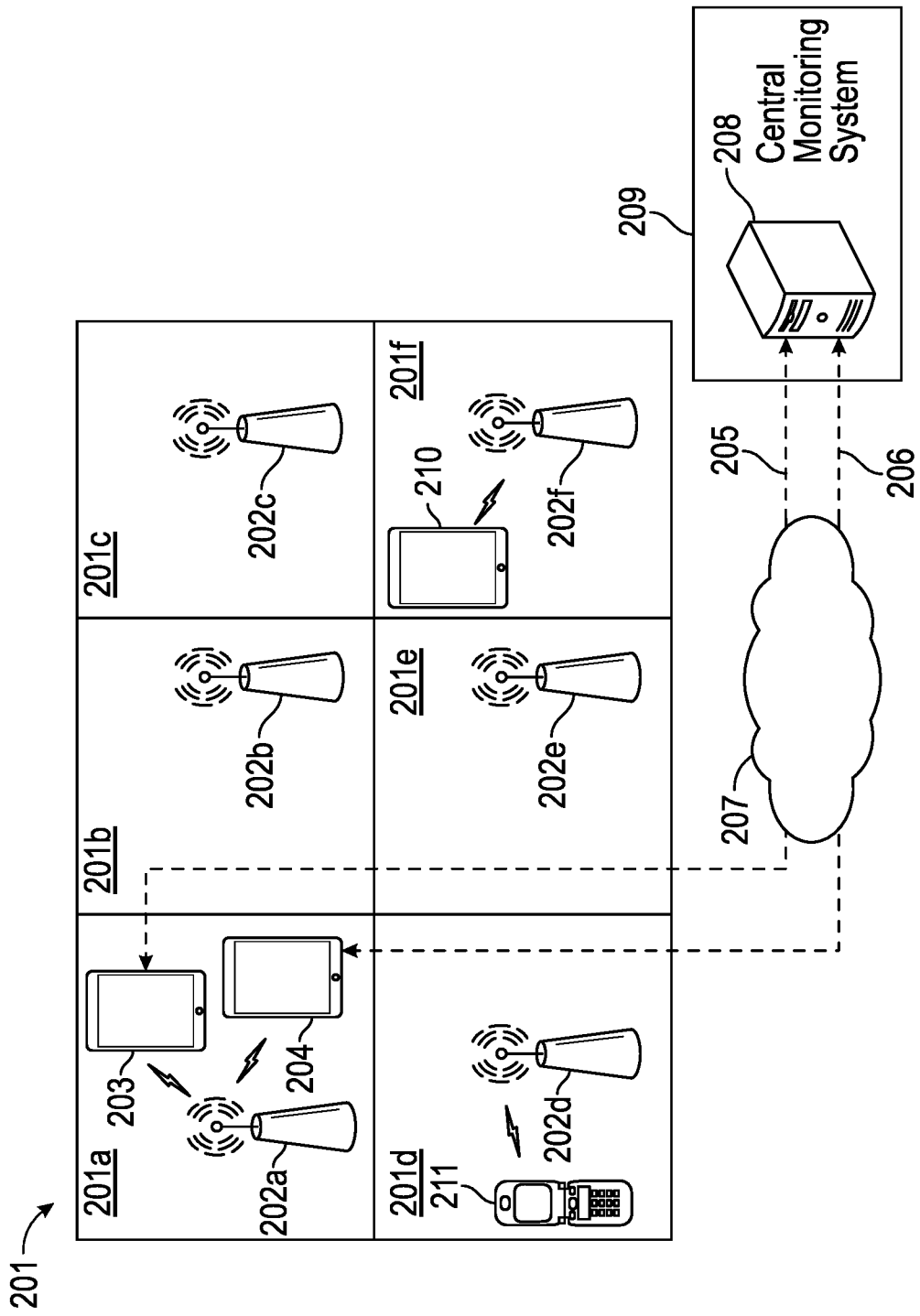

Referring to FIG. 2, two wireless devices 203 and 204, such as tablets, smartphones, laptops, etc., are located in zone 201a. Devices 203 and 204 attach to WAP 202a and transmit periodic heartbeat signal 205 and 206, respectively, over a secure data connection through WLAN 207 to a central monitoring system 208. WLAN 207 may be, for example, a local network associated with facility 201 and configured to support WAPs 202a-f in facility areas 201a-f. The heartbeat signal may be generated automatically by an application running in the background of the wireless device so that the user of the device is not aware that such heartbeat messages are being generated and transmitted.

In one embodiment, central monitoring server 208 may be a network server or other dedicated component of a communication system. In other embodiments, the functions of central monitoring server 208 may be performed by communications processing system 102, investigation and monitoring module 111, or managed access system 121. The location 209 of central monitoring system 208 may be the same as controlled-environment facility 201 or it may be a remote location that serves multiple controlled-environment facilities. Other devices, such as tablet 210 and mobile phone 211, in other areas of controlled environment facility 201 may be in communication with other access points and may or may not send heartbeat signals to central monitoring server 208.

The heartbeat signals 205 and 206 may be periodic signals that are bi-directionally exchanged between central monitoring system 208 and devices 203 and 204. Alternatively, heartbeat signals 205 and 206 may be sent periodically unidirectionally from devices 203 and 204 to central monitoring system 208. The heartbeat signals 205 and 206 may be sent at set intervals and/or upon the occurrence or detection of certain events, such as upon attachment to a WAP, when certain user inputs occur, when certain device software is activated, etc.

The heartbeat signals 205 and 206 may comprise minimal information, such as an identifier of the sending device 203 or 204. The heartbeat signals 205 and 206 may also be more advanced for certain embodiments. For example, devices 203 and 204 may continuously measure or monitor performance parameters in the background, such as the signal strength for the connection to WAP 202a. The heartbeat signal may include preselected device status data, such as a current signal strength, available or in-use bandwidth, and so forth. Furthermore, devices 203 and 204 may monitor activity within the local zone 201a, such as communications events involving WAP 202a and/or other nearby devices. Information about such events may be included in the heartbeat signals sent by devices 203 and 204.

The heartbeat signals 205 and 206 may identify a current location of the corresponding device, 203 or 204. The device may send location information, such as GPS or other position data, and/or network information, such as the identifier of the access point 202a, as a component of the heartbeat signal. This location information allows central monitoring system 208 to monitor and track each device's current location. Alternatively, the routing information for the heartbeat signals, such as the identity of WAP 202a where the heartbeat signals 205 and 206 originate and/or other node information associated with WLAN 207, may be used by central monitoring system 208 to determine or estimate the current location of each device 203 and 204.

Central monitoring system 208 may utilize the data in the heartbeat signals to determine whether devices are in the same zone or area. For example, devices 203 and 204 may report the same WAP 202a in heartbeat signals 205 and 206, which clearly indicates that the devices are in or very near zone 201a. Alternatively, one or both devices may report activity of nearby devices. For example, the heartbeat signal 205 from device 203 may report observing communications activity related to device 204, such as the IP address, MAC address, or device name used in messages exchanged between access point 202a and device 204.

Figure 3:
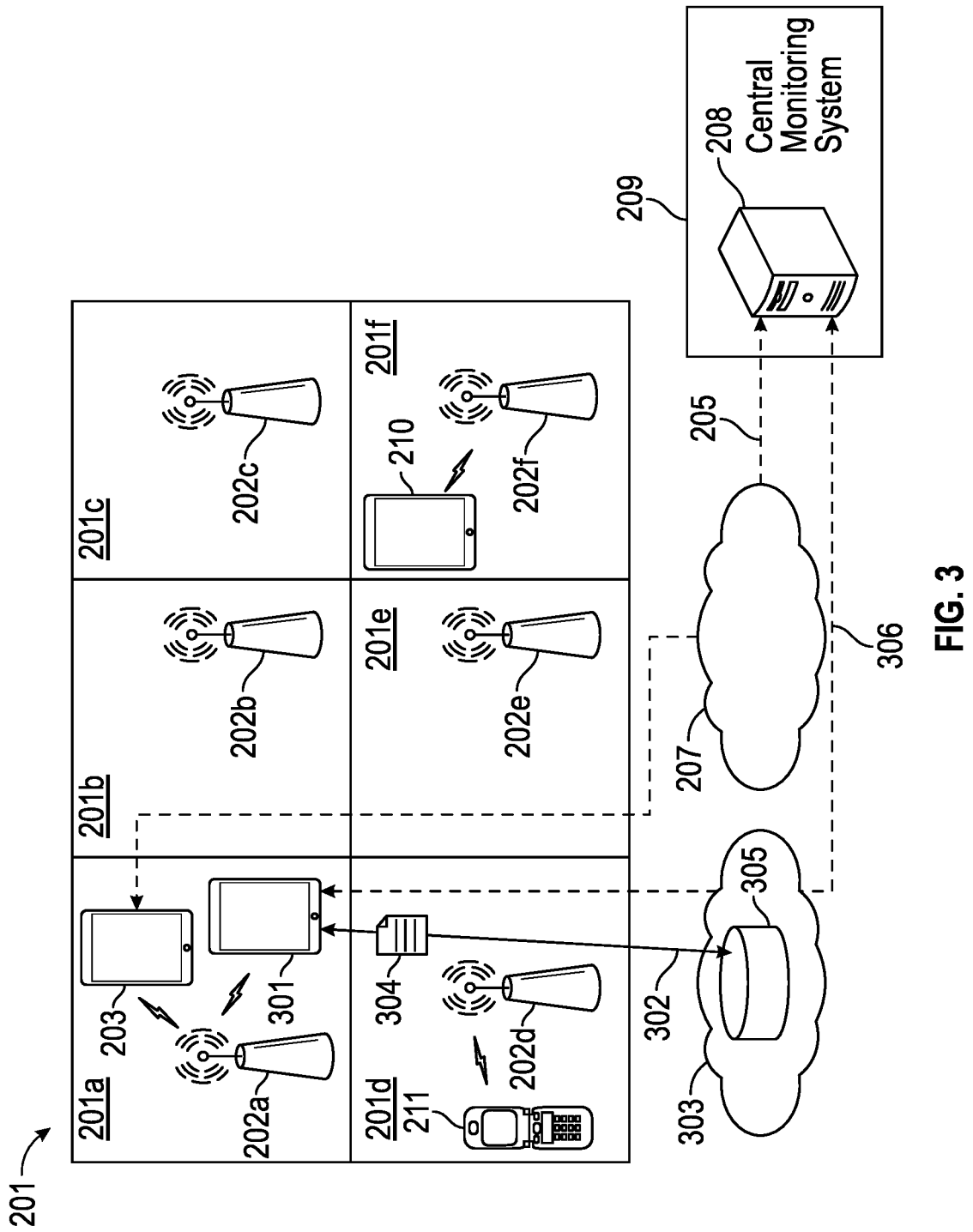

FIG. 3 illustrates unauthorized or illegal activity within controlled-environment facility 201. Device 301 has bypassed WAP 202a and has established a data connection 302 to an external network 303, which may be, for example, a public network such as the Internet or commercial cellular network Connection 302 may be supported, for example, by a contraband cell phone or an unauthorized hotspot within zone 201a. Alternatively, device 301 may be connected to a commercial wireless network, such as a cellular data network. Connection 302 allows the user on device 301 to download content 304 to the device from sources 305 that are accessed via network 303. In the situation where facility 201 is a jail, prison, or detention center, such uncontrolled and unmonitored connections 302 are potentially dangerous as they allow an inmate, prisoner, or detainee to participate in unauthorized and illegal communications.

Because device 301 is not using WAP 202a, its heartbeat signal 306 is not routed through WLAN 207 but is instead routed to central monitoring server 208 though network 303. Central monitoring server 208 may detect this illegal activity using the heartbeat signal 306 from device 301. The routing for heartbeat signal 306 will indicate to central monitoring server 208 that device 301 is not communicating via an authorized WAP 202a-f or via authorized WLAN 207. For example, the heartbeat signal may be received via the public internet instead of via a private data connection. In some embodiments, the heartbeat signal may identify the WAP or and other node to which the sending device is attached. Since device 301 is not attached to WAP 202a, heartbeat signal 306 will not identify an authorized node.

In some embodiments, the heartbeat signal may be used simply to track which devices are active and/or their location. In other embodiments, the heartbeat signal may be used to authorize or activate certain features on the device. For example, if a proper heartbeat signal 205 is received, then central monitoring server 208 may send a reply message with authorization to use certain software on device 203. Alternatively, upon detection of proper heartbeat signal 205, then central monitoring server 208 may authorize other network components, such as communication gateways or content storage devices, to communicate with device 203. When an improper heartbeat signal 306 is received, then central monitoring server 208 can withhold any authorization reply message to prevent use of certain software or features on device 301. Additionally, receipt of an improper heartbeat 306, may cause central monitoring server 208 to instruct other network nodes and devices to not communicate with, or allow access to, device 301.

Central monitoring system 208 may detect when device 301, or any other device 203, 204, 210, or 211, has stopped sending its heartbeat signal via network 207 and instead begins sending heartbeat signal 306 via network 303. Central monitoring system 208 may be configured to instruct device 301 to take various actions in this situation. For example, central monitoring system 208 may instruct device 301 to shut down or to stop all wireless communication. Alternatively, central monitoring system 208 may instruct device 301 to begin recording all transactions and communications that occur while attached to external network 303 and/or to send additional reports in the heartbeat signal 306, such as lists of files uploaded or downloaded, URLs associated with communications and/or file transfers, etc.

Device 301 may also detect when its heartbeat signal 306 has been routed through a new network 303 instead of expected facility network 207. This may happen, for example, if the user disables the correct routing through the system communication and attaches the device to a contraband or unauthorized WAP or hotspot so that the heartbeat signal is routed over an unauthorized WiFi network. When such a change is detected, device 301 may send an alert to central monitoring system 208 and/or may start recording data, such as transactions and communications that occur while attached to external network 303. Device 301 may send additional reports in the heartbeat signal 306, such as lists of files uploaded or downloaded, URLs associated with communications and/or file transfers, etc. Alternatively, device 301 may store data regarding transactions and communications with the unauthorized network 303 and may upload reports regarding such data once device 301 reattaches to the authorized network 207. In other embodiments, device 301 may shut down or may stop all wireless communications on its own upon detecting that it is connected to an unauthorized network 303.

Figure 4:
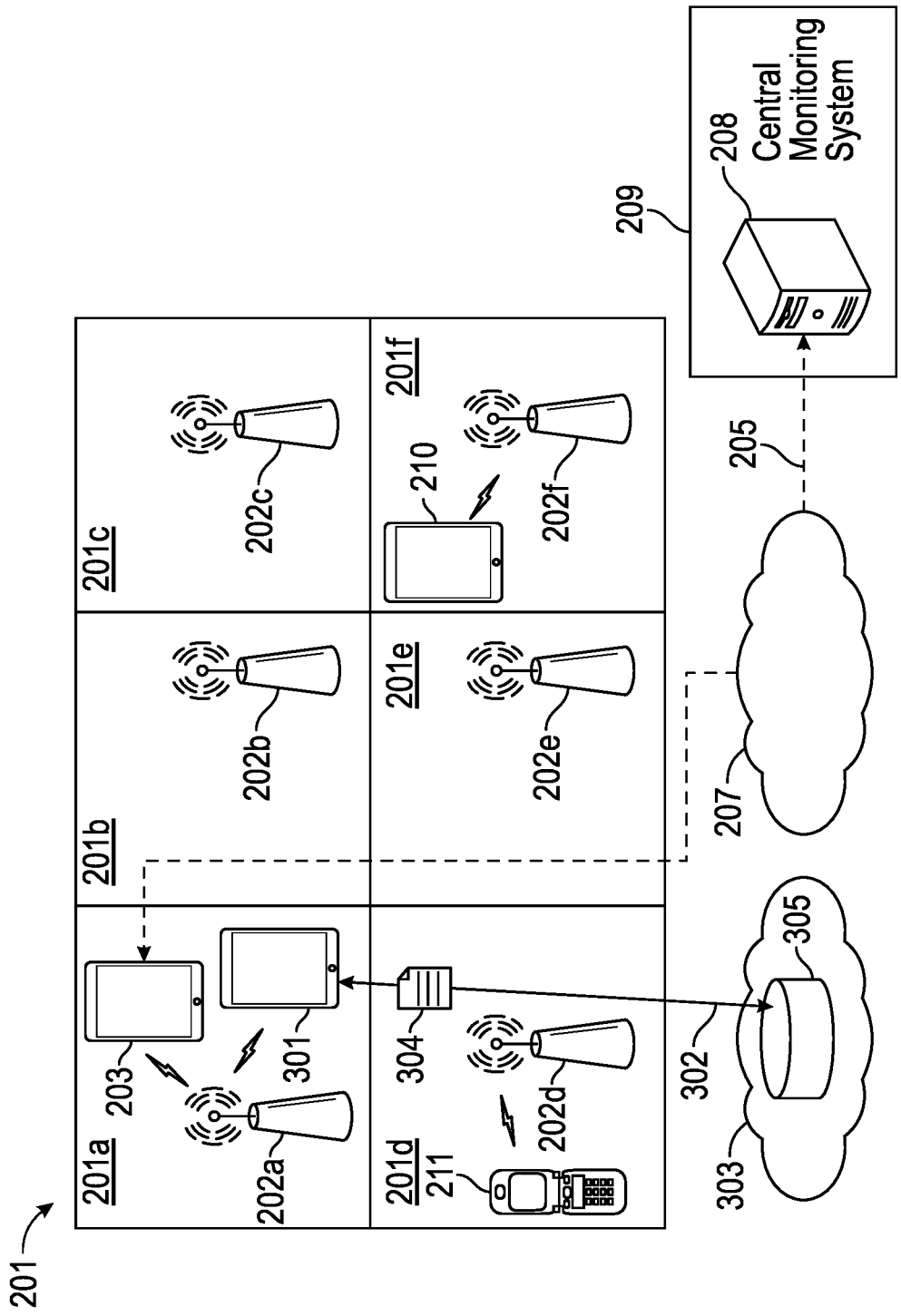

FIG. 4 depicts a situation in which a user has disabled the heartbeat signal from device 301. As a result, central monitoring server 208 no longer detects heartbeat 306 (FIG. 3) from device 301. This eliminates the ability of central monitoring server 208 to detect illegal behavior other than noting the absence of heartbeat 306. In one embodiment, the heartbeat signal may provide status messages such as identifying the current software loaded and/or used, listing recent content downloaded, reporting current or recent locations, and the like. With the removal of heartbeat signal 306, the central monitoring server 208 no longer receives this status information from device 301 and cannot monitor for additional unauthorized or illegal activity. As noted in reference to FIG. 3, when an improper heartbeat signal is received, central monitoring server 208 may withhold authorization messages and may instruct other network devices to not communicate with a device. Similar actions may be taken when no heartbeat signal at all is received from device 301.

Figure 5:
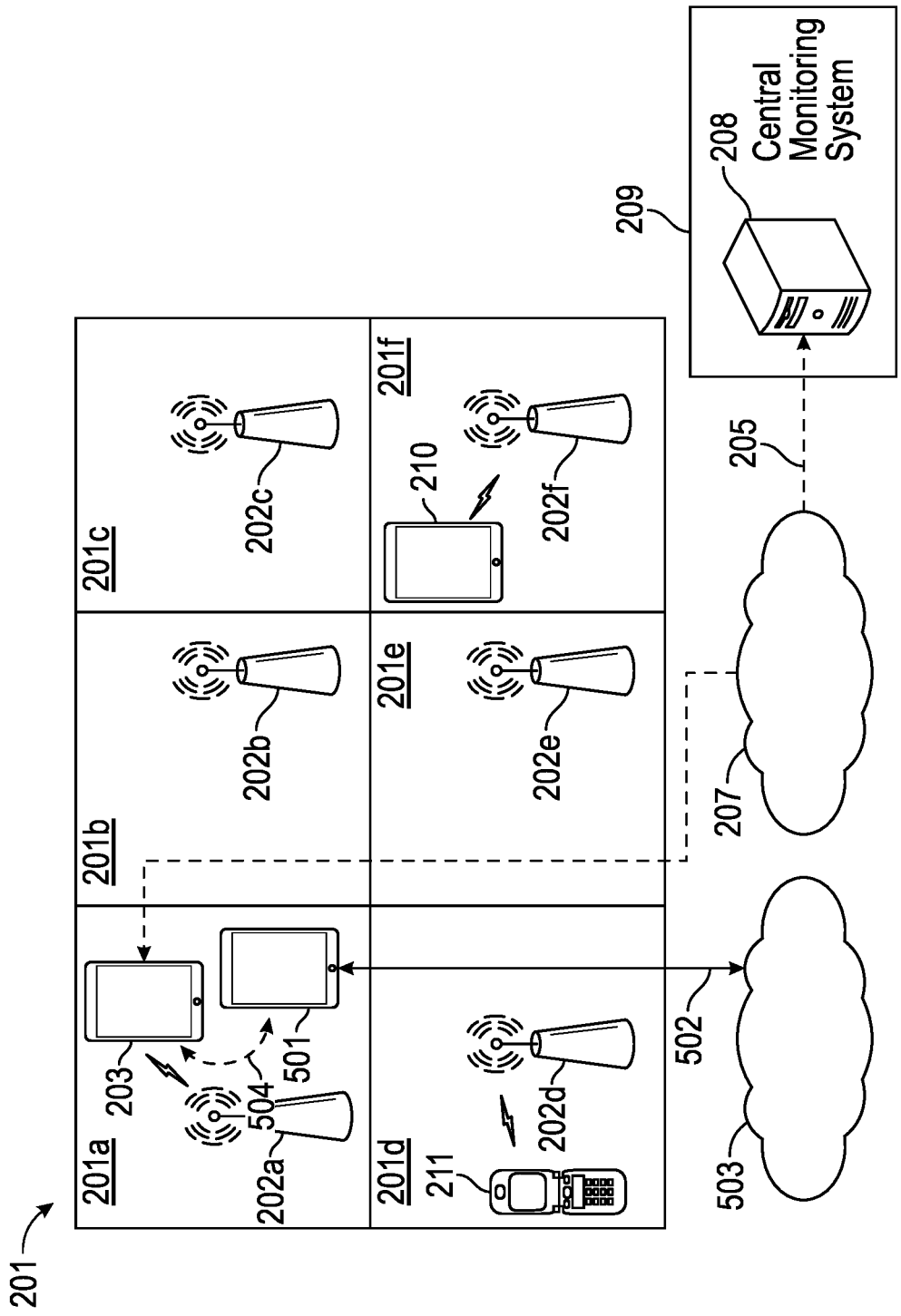

FIG. 5 depicts a situation similar to FIG. 4 in which a device 501 has stopped sending a heartbeat signal to central monitoring server 208. In FIG. 5, however, device 203 is able to detect device 501. Device 203 is able to detect the proximity of device 501 using a wireless signature, such as RF, WiFi, Bluetooth, or other transmissions from device 501. The signals used by device 501 to establish connection 502 to remote network 503 are passively observed or detected 504 by device 203. Device 203 may monitor communication channels, such as one or more of: cellular data channels, WiFi channels, Bluetooth channels, and commercial telephone network channels, or channels on networks using Low Power Wide Area Network (LPWAN) or Low-Power Long Range (LoRa) technologies, for example. Device 203 collects information about device 501 and connection 502 and sends that information to central monitoring server 208 as proximity detection data in heartbeat 205.

In some embodiments, device 501 may be able to communicate data to device 204, such as statistics regarding data and/or content being downloaded to device 501. Such information may be included with the proximity detection data in heartbeat 205, which will reinforce any determination that device 501 is using an illegal data connection. Moreover, the proximity alert sent by device 203 allows central monitoring server 208 to strengthen any determination that device 501 has purposely disabled its heartbeat signal.

Device 203 is configured to transmit proximity data for any nearby devices back to central monitoring server 208 in its own periodic heartbeat transmission 205. Device 203 may also send any additional information that is received from, or observed about, device 501, such as downloading of inappropriate content, the identity of external network 502, etc.

In one embodiment, wireless devices in a controlled-environment facility are connected to a controlled data source so that all of their communication flows through a WAP that is managed by the facility's communication platform. As part of this channel the devices' location information is provided and may be sent to a central monitoring system for analysis. A central monitoring system may look for correlations between device locations to provide the capability to identify associations between users. Moreover, the system could filter out areas that are not of interest, such as classrooms or cafeterias, focus on only those that might warrant further investigation. Introducing a proximity detection capability to the wireless devices in a facility would allow the devices to "sniff" the proximity of nearby devices and allow the devices to record their own association data. This data could be immediately sent as telemetry via the WAP to a central monitoring system or may be uploaded at a later point in time.

Residents of controlled-environment facilities may be utilizing illegal data connections with their wireless devices, such as tablets. The residents may use contraband cell phones, for example, and connect them illegally to the tablets to download content, such as electronic mail messages. Embodiments disclosed herein allow for an approach that is external to the wireless devices to detect such unauthorized connections. The proximity detection capability (i.e., "sniffing") allows for detection of collocated devices. This data may then be transmitted to a central monitoring system to be used later for analysis.

As the facility's WAP infrastructure reports wireless device location data, the central monitoring system may look for previously reported proximity data that was transmitted from other devices and cross reference this data against the newly received WAP data. If, for example, wireless device A reports proximity with wireless device B but only device A's signature shows up against a WAP location report, then an alert may be issued to warn that device B might be using a non-standard way to communicate and retrieve/send data.

In a further embodiment, as part of its proximity detection, the wireless devices may have a mechanism to exchange information, such as data-usage statistics. Data usage reports would be extremely useful for detection of an illegal data connection. If the central monitoring system is not in communication with a wireless device (i.e., not receiving heartbeat signals) but the missing device is detected by an active device, the active device may report on the content that the missing device has downloaded, which may indicate that an illegal data connection is being used.

Embodiments of the present systems and methods for contraband device identification and alert messaging, as described herein, may be implemented or executed, at least in part, by one or more computer systems. FIG. 6 is a block diagram illustrating a wireless device proximity detection system 600 according to one embodiment, which may be, for example, a tablet or laptop computer, a smartphone, or the like. As illustrated, device 600 includes one or more processors 610A-N coupled to a system memory 620 via bus 630. Computer system 600 further includes a network interface 640 coupled to bus 630. Network interface 640 provides a connection to network 645, which may provide communication connections to other alert systems, investigation and monitoring systems, managed access systems, and the like. One or more I/O controllers 650 are coupled to peripheral devices, such as cursor control device 660, keyboard 670, display(s) 680, etc. Each of I/O devices 660, 670, 680 may be capable of communicating with I/O controllers 650, for example, via a wired connection (e.g., serial port, Universal Serial Bus port) or wireless connection (e.g., Wi-Fi, Bluetooth, Near Field Communications Link, etc.). Other devices, such as microphones, antennas/wireless transducers, phone detection modules, etc., may be coupled to I/O controller 650.

Wireless transceiver module 690 uses antenna 691 to communicate on and monitor frequencies used by other wireless devices or WAPs. Wireless transceiver module 690 may be configured to send notifications only when detected signals are above a certain signal strength to ensure that the detected device is close by and likely within a monitored location. Wireless transceiver module 690 may be further configured to send notifications only when certain messages or activity are detected on the monitored frequencies, such as cellular attachment requests or WiFi probe requests. Wireless transceiver module 690 may be configured to only monitor and receive signals but may also be configured in other embodiments to transmit so that two-way communication connections can be established with other wireless devices.

In various embodiments, computer system 600 may be a single-processor system including one processor 610A, or a multi-processor system including two or more processors 610A-N (e.g., two, four, eight, or another suitable number). Processors 610 may be any processor capable of executing program instructions. For example, in various embodiments, processors 610 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 610 may commonly, but not necessarily, implement the same ISA. Also, in some embodiments, at least one processor 610 may be a graphics processing unit (GPU) or another dedicated graphics-rendering device.

System memory 620 may be configured to store program instructions and/or data accessible by processor 610. In various embodiments, system memory 620 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 620 as program instructions 625 and data storage 635, respectively. In other embodiments, program instructions and/or data may be received, sent, or stored upon different types of computer-accessible media or on similar media separate from system memory 620 or computer system 600.

A computer-accessible medium may include any tangible and/or non-transitory storage media or memory media such as electronic, magnetic, or optical media—e.g., disk or CD/DVD-ROM coupled to computer system 600 via bus 630. The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 630 may be configured to coordinate I/O traffic between processor 610, system memory 620, wireless transcriber module 690, and any peripheral devices in the computer system, including network interface 640 or other peripheral interfaces, such as I/O devices 660, 670, 680. In some embodiments, bus 630 may perform any necessary protocol, timing, or other data transformations to convert data signals from one component (e.g., system memory 620) into a format suitable for use by another component (e.g., processor 610). In some embodiments, bus 630 may include support for devices attached through various types of peripheral buses, such as a variant of the Peripheral Component Interconnect (PCI) bus standard or the Universal Serial Bus (USB) standard, for example. In some embodiments, the function of bus 630 may be split into two or more separate components, such as a northbridge chipset and a southbridge chipset, for example. In addition, in some embodiments some or all the functionality of bus 630, such as an interface to system memory 620, may be incorporated directly into processor(s) 610A-N.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 650 may, in some embodiments, enable communications with one or more display terminals, keyboards, keypads, touchpads, scanning devices, voice or optical recognition devices, mobile devices, or any other devices suitable for entering or retrieving data by one or more computer system 600. Multiple I/O controllers 650 may be present in computer system 600 or may be distributed on various nodes of computer system 600. In some embodiments, I/O devices may be separate from computer system 600 and may interact with one or more nodes of computer system 600 through a wired or wireless connection, such as over network interface 640.

As shown in FIG. 6, system memory 620 may include program instructions 625, configured to implement certain embodiments described herein, and data storage 635, comprising various data may be accessible by program instructions 625. In an embodiment, program instructions 625 may include software elements, which may be configured to affect the operations discussed in FIGS. 1 through 5. Program instructions 625 may be implemented in various embodiments using any desired programming language, scripting language, or combination of programming languages and/or scripting languages (e.g., C, C++, C#, Java™, JavaScript™, Perl, etc.). Data storage 635 may include data that may be used in these embodiments (e.g., recorded communications, profiles for different modes of operations, etc.). In other embodiments, other or different software elements and data may be included.

A person of ordinary skill in the art will appreciate that computer system 600 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 8, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

A person of ordinary skill in the art will appreciate that computer system 600 is merely illustrative and is not intended to limit the scope of the disclosure described herein. The computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

FIG. 7 is a flowchart 700 illustrating a method for operating a wireless device that is configured to monitor activity of other wireless devices on a network. In step 701, the wireless device attaches to an approved wireless access point within a controlled-environment facility. The approved wireless access point may be, for example, an access point that is a component of a wireless local area network installed in the controlled-environment facility, such as an LPWAN or LoRa network.

In step 702, the monitoring wireless device sends status messages at intervals to a central monitoring system. The status messages may be sent at preset periodic intervals, which may be time-based such as after a repeating duration or at certain times of the dat. The periodic intervals may also be determined based upon predetermined events, such as when the wireless device connects to a network, accesses a file, loads an application, sends a message or file, receives a message or file, detects the presence of another wireless device, or the like. The status messages may be heartbeat messages that notify the central monitoring system when the monitoring wireless device is in use, turned on, or otherwise operating. The status messages may comprise, for example, one or more of: a location of the wireless device, an identifier of the wireless access point, a list of content downloaded by the wireless device, a list of content uploaded by another wireless device, and a list of software in use on the wireless device. The status messages may further comprise one or more of: an identifier of another wireless device, a list of communications by another wireless device, a list of content downloaded by another wireless device, a list of content uploaded by another wireless device, an identifier of an access point in communication with another wireless device.

In step 703, the wireless device monitors one or more communication channels for activity by other wireless devices. The monitored communication channels may comprise one or more of: cellular data channels, WiFi channels, Bluetooth channels, and commercial telephone network channels, or channels on LPWAN or LoRa networks.

In step 704, the wireless device reports the activity of other wireless devices to the central monitoring server in a status message. The activity by the other wireless devices may comprise communications between the other wireless devices and unauthorized access points inside the controlled-environment facility or access points outside the controlled-environment facility. The activity of the other wireless devices may be reported to the central monitoring server in a next transmitted status message from the wireless device. Alternatively, the monitoring wireless device may transmit a detection-report message as soon as another wireless device is detected or observed.

In step 705, the wireless detects disconnection from the approved wireless access point and detects a connection to an unauthorized network.

In step 706, the wireless network begins recording data associated with transactions and communications with the unauthorized network, such as storing details regarding files uploaded to or downloaded from the unauthorized network, recording URLs, addresses, names, or other identification associated with communications to and from the unauthorized network, and/or storing such communications, such as messages, commands, instructions, email, or the like.

In step 707, the wireless device reports data associated with the unauthorized network to the central monitoring server. The reports may comprise, for example, a list of URLs accessed on the unauthorized network, a list of files uploaded to and/or downloaded from the unauthorized network, data associated with communications to and from the unauthorized network, and the like.

In step 708, the wireless device terminates communications with the unauthorized network. Such termination may be accomplished by a range of actions, such as shutting down the wireless device, disabling wireless communications on the device, or blocking communications or transactions to and from the unauthorized network. This allows the wireless device to either become inoperable or to continue to operate with reduced functionality.

It will be understood that, in other embodiments, the steps listed in flowchart 700 may occur in any order and some steps may be skipped altogether. For example, the wireless device may attach to an authorized network in step 701 and jump to step 705 if disconnection from the authorized network is detected before any status messages are sent (702), channels monitored (703), or reports sent (704). Likewise, the wireless device may jump from step 705 to step 708 and terminate communications with the unauthorized network as soon as an unauthorized network connection is detected without recording (706) or reporting (707) any data associated with the unauthorized network.

FIG. 8 is a flowchart 800 illustrating a method for operating a network monitoring system. In step 801, the network monitoring system receives status messages at intervals from a first wireless device. The first wireless device is attached to an approved wireless access point that is a component of a wireless local area network at the controlled-environment facility. The status messages are received via the wireless local area network associated with a controlled-environment facility. The network monitoring system may be responsible for monitoring wireless devices at one or more controlled-environment facility and may be located at a monitored facility or may be centrally or remotely located. The network monitoring system may be a component of, for example, a managed access system, an investigation and monitoring system, or a communication management system for controlled-environment facilities.

In step 802, the network monitoring system extracts proximity data from one or more status messages. The status messages are received from the first wireless device. The proximity data is associated with a second wireless device and provides information associated with communications by the second wireless device. The status messages may be, for example, heartbeat messages that sent at regular intervals by the first wireless device. The status messages may comprise, for example, one or more of: a location of the wireless device, an identifier of the wireless access point, a list of content downloaded or uploaded by the wireless device, and a list of software in use on the wireless device.

The proximity data may comprise, for example, one or more of: an identifier of the second wireless device, a list of communications by the second wireless device, a list of content downloaded by the second wireless device, a list of content uploaded by the second wireless device, an identifier of an access point in communication with the second wireless device. The network monitoring system may determine whether the access point in communication with the second wireless device is inside the controlled-environment facility.

In step 803, the network monitoring system determines if status messages have been received from the second wireless device.

In step 804, the network monitoring system assigns a location to the second wireless device based upon a location of the first wireless device when status messages have not been received from the second wireless device.

In step 805, the network monitoring system authorizes the first wireless device to access selected content and/or to use certain software in response to receipt of the status message. This would allow the network monitoring system to control the content and/or applications that may be used on an associated wireless device under certain conditions, such as when operating on an authorized network or in an authorized location.

In step 806, the network monitoring system blocks the second wireless device from accessing selected content and/or using certain software in response to failure to receive status messages from the second wireless device.

In step 807, the network monitoring system identifies a third wireless device that is in the same location as the first wireless device. The location of the third wireless device may have been reported in, or inferred from, status messages sent by the third wireless device. Alternatively, the location of the third wireless device may have been reported in, or inferred from, proximity data in status messages sent by the first wireless device.

In step 808, the network monitoring system associates the location of the third wireless device and the location of the second wireless device. In one embodiment, the first wireless device may provide proximity data for both the second and third wireless devices, which indicates to the network monitoring system that all three devices are in the same area or zone of the controlled-environment facility. Therefore, even if the second and/or third wireless device do not report their location to the network monitoring system directly, the proximity data from the first wireless device allows the network monitoring system to determine that the devices are collocated.

The current and past locations of the wireless devices may be tracked by the network monitoring system, which further allows the network monitoring system to determine relationships between the wireless devices. For example, the network monitoring system may determine how often and for how long certain wireless devices visit the same location whether or not they are in the same location at the same time.

It will be understood by those of ordinary skill in the art that the steps in flowcharts 700 and 800 may occur in any order and that certain steps may be performed concurrently or sequentially with other steps and that steps may be performed one time or multiple times.

In one embodiment, a system for monitoring wireless devices in a controlled-environment facility comprises a plurality of wireless devices that are configured to operate in a wireless local area network assigned to the controlled-environment facility. The wireless devices are further configured to monitor communication channels for activity by other wireless devices and to report the activity in status messages. A central monitoring system is configured to receive status messages from the plurality of wireless devices. The central monitoring system is configured to determine a location of a wireless device within the controlled-environment facility based upon a status message from the wireless device. The central monitoring system is further configured to assign a location to a selected wireless device when a status message has not been received from the selected wireless device and when the selected wireless device is identified in a status message from another wireless device.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

What is claimed is:

1. A method of operating a monitoring wireless device, comprising:
    attaching to an approved wireless access point within a controlled-environment facility;
    sending status messages at intervals to a central monitoring system;
    monitoring one or more communication channels for activity by other wireless devices, comprising communications between the other wireless devices and an unauthorized access point inside the controlled-environment facility and/or an access point outside the controlled-environment facility; and
    reporting the activity of other wireless devices to the central monitoring server in a status message.

2. The method of claim 1, wherein the approved wireless access point comprises an access point that is a component of a wireless local area network installed in the controlled-environment facility.

3. The method of claim 1, wherein the status messages are sent at preset periodic intervals.

4. The method of claim 1, wherein the intervals for sending status messages are determined based upon predetermined events.

5. The method of claim 1, wherein the status messages are heartbeat messages that notify the central monitoring system when the monitoring wireless device is in use.

6. The method of claim 1, wherein the status messages comprise one or more of: a location of the wireless device, an identifier of the wireless access point, a list of content downloaded by the wireless device, a list of content uploaded by another wireless device, and a list of software in use on the wireless device.

7. The method of claim 1, wherein the status messages comprise one or more of: an identifier of another wireless device, a list of communications by another wireless device, a list of content downloaded by another wireless device, a list of content uploaded by another wireless device, an identifier of an access point in communication with another wireless device.

8. The method of claim 1, wherein the one or more communication channels comprise one or more of: cellular data channels, WiFi channels, Bluetooth channels, and commercial telephone network channels.

9. The method of claim 1, wherein the activity of other wireless devices is reported to the central monitoring server in a next transmitted status message from the wireless device.

10. A system, comprising:
    a plurality of wireless devices that are configured to operate in a wireless local area network for a controlled-environment facility, the plurality of wireless devices further configured to monitor communication channels for activity by other wireless devices, comprising communications between the other wireless devices and an unauthorized access point inside the controlled-environment facility and/or an access point outside the controlled-environment facility, and to report the activity in status messages;
    a central monitoring system configured to receive status messages from the plurality of wireless devices, wherein the central monitoring system is configured to determine a location of a wireless device within the controlled-environment facility based upon a status message from the wireless device; and
    wherein the central monitoring system is further configured to assign a location to a selected wireless device when a status message has not been received from the selected wireless device and when the selected wireless device is identified in a status message from another wireless device.

11. The system of claim 10, wherein the central monitoring system is configured to extract proximity data from the status messages, wherein the proximity data provides information associated with communications by the wireless devices; and
    wherein the central monitoring system is configured to assign a location to a first wireless device based upon a location of a second wireless device when status messages have not been received from the first wireless device.

12. The system of claim 11, wherein the second wireless device is attached to an approved wireless access point that is a component of the wireless local area network at the controlled-environment facility.

13. The system of claim 11, wherein the status messages are heartbeat messages sent at regular intervals by the second wireless device.

14. The system of claim 10, wherein the status messages comprise one or more of: a location of a wireless device, an identifier of a wireless access point, a list of content downloaded or uploaded by a wireless device, and a list of software in use on a wireless device.

15. The system of claim 11, wherein the proximity data comprises one or more of: an identifier of the first wireless device, a list of communications by the first wireless device, a list of content downloaded by the first wireless device, a list of content uploaded by the first wireless device, an identifier of an access point in communication with the first wireless device.

16. The system of claim 12, wherein the central monitoring system is configured to determine whether the access point in communication with a wireless device is inside the controlled-environment facility.

17. The system of claim 12, wherein the central monitoring system is configured to authorize the first wireless device to access selected content, and/or to use certain software, in response to receipt of the status message.

18. The system of claim 12, wherein the central monitoring system is configured to block the first wireless device from accessing selected content, and/or using certain software, in response to failure to receive status messages from the second wireless device.

19. A non-transitory computer readable medium comprising program instructions stored thereupon, which upon execution by a wireless device cause the wireless device to:
- attach to an approved wireless access point within a controlled-environment facility;
- send status messages at intervals to a central monitoring system;
- monitor one or more communication channels for activity by other wireless devices, comprising communications between the other wireless devices and an unauthorized access point inside the controlled-environment facility and/or an access point outside the controlled-environment facility; and
- report the activity of other wireless devices to the central monitoring server in a status message.

20. The non-transitory computer readable medium of claim 19, wherein the status message comprise one or more of:
- a location of the wireless device;
- an identifier of the wireless access point;
- a list of content downloaded by the wireless device;
- a list of software in use on the wireless device;
- an identifier of another wireless device;
- a list of communications by another wireless device;
- a list of content downloaded by another wireless device;
- a list of content uploaded by another wireless device; and
- an identifier of an access point in communication with another wireless device.

* * * * *